United States Patent [19]
West

[11] 3,961,480
[45] June 8, 1976

[54] PRESSURE SOURCE AND SYSTEMS INCORPORATING IT

[76] Inventor: William S. West, 380 Cliff Drive Apt. 2, Pasadena, Calif. 91107

[22] Filed: Jan. 17, 1974

[21] Appl. No.: 432,667

[52] U.S. Cl. ............................ 60/496; 417/337
[51] Int. Cl.² .................... F03B 13/12; F03G 3/00
[58] Field of Search ............ 60/502, 503, 495, 496, 60/497; 417/330, 333, 337

[56] References Cited
UNITED STATES PATENTS

| | | | |
|---|---|---|---|
| 291,340 | 1/1884 | Harvey | 60/503 |
| 467,072 | 1/1892 | White | 417/337 |
| 552,872 | 1/1896 | Schade | 60/503 |
| 697,595 | 4/1902 | Anderson | 417/337 X |
| 705,047 | 7/1902 | Deis | 417/337 X |
| 939,506 | 11/1909 | Hubmann | 60/503 |
| 2,613,608 | 10/1952 | Beam | 417/337 |
| 3,143,077 | 8/1964 | Scanavino | 417/337 |
| 3,292,365 | 12/1966 | McCoin | 60/497 X |
| 3,487,228 | 12/1969 | Kriegel | 60/497 X |

FOREIGN PATENTS OR APPLICATIONS

| | | | |
|---|---|---|---|
| 118,917 | 9/1930 | Austria | 60/495 |
| 516,729 | 10/1953 | Belgium | 60/495 |
| 771,783 | 8/1934 | France | 60/496 |
| 323,111 | 8/1957 | Germany | 60/495 |
| 372,435 | 2/1907 | Switzerland | 60/497 |

*Primary Examiner*—Martin P. Schwadron
*Assistant Examiner*—H. Burks, Sr.
*Attorney, Agent, or Firm*—Donald D. Mon

[57] ABSTRACT

A pressure source for providing a stream of liquid at a substantial pressure. The pressure source includes pressurizing means such as a piston-cylinder assembly to which a force is applied to expel the contents thereof under pressure to form the stream. Weight means moving from an upper elevation to a lower elevation provides the said force. The pressure source also includes means to release, in discrete quantums of mass, the weight means for downward movement, in the preferred embodiments, without substantial impediment other than the pressurizing means. This provides sufficient force to supply a stream at a usefully high pressure, for example one which can drive a turbine wheel or a linear actuator at a useful velocity. In a preferred form, the weight means is a buoyant body, and the pressure source includes lift means to float the buoyant body to the upper elevation, and then to permit it to descend to the lower elevation. Systems which can utilize this power source include rotary shaft drives such as turbines, linear shaft drives (linear actuators), and rotary devices driven by linear drives through unidirectional transmission elements (one-way clutches). The systems may also include driven elements such as electrical generators.

29 Claims, 21 Drawing Figures

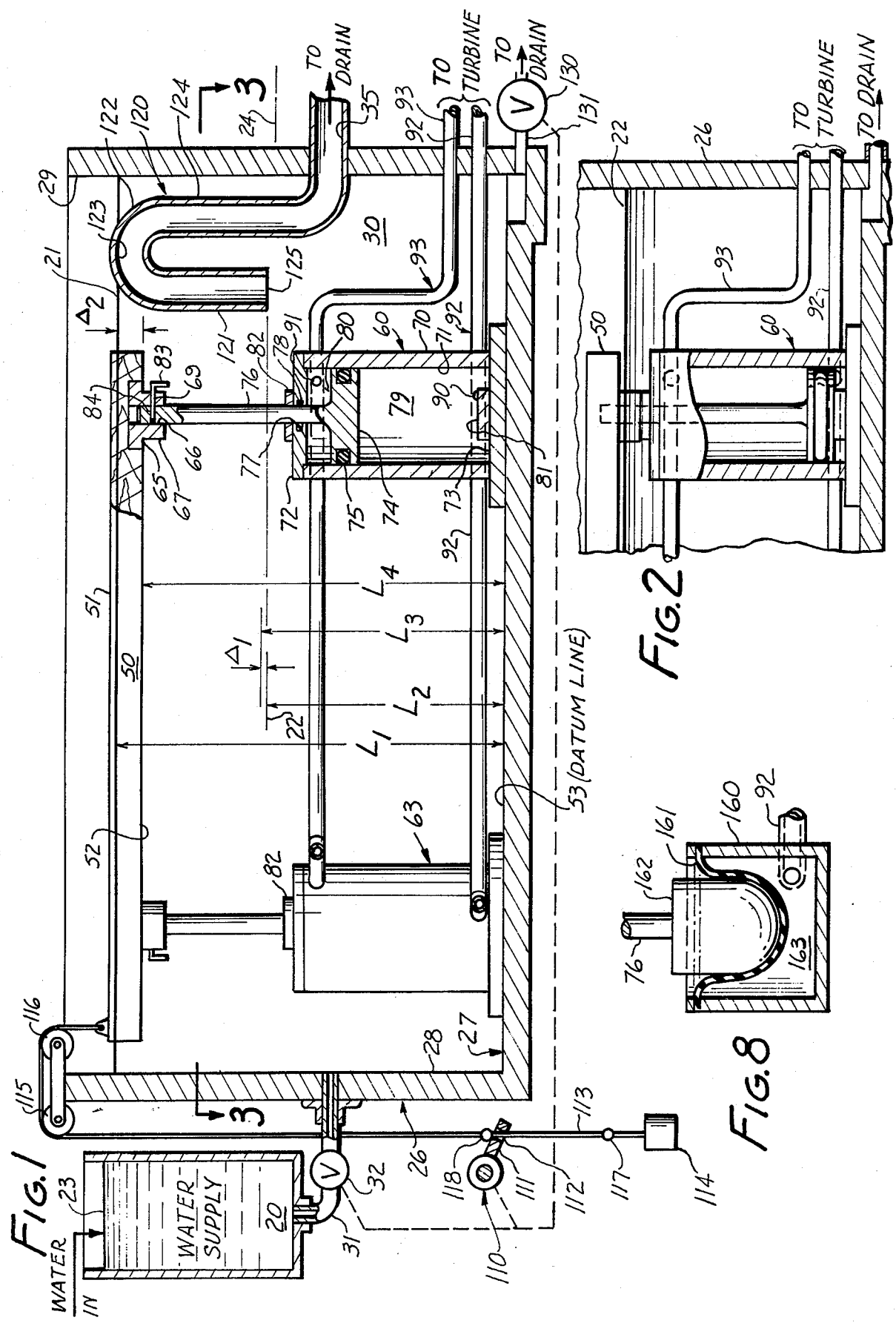

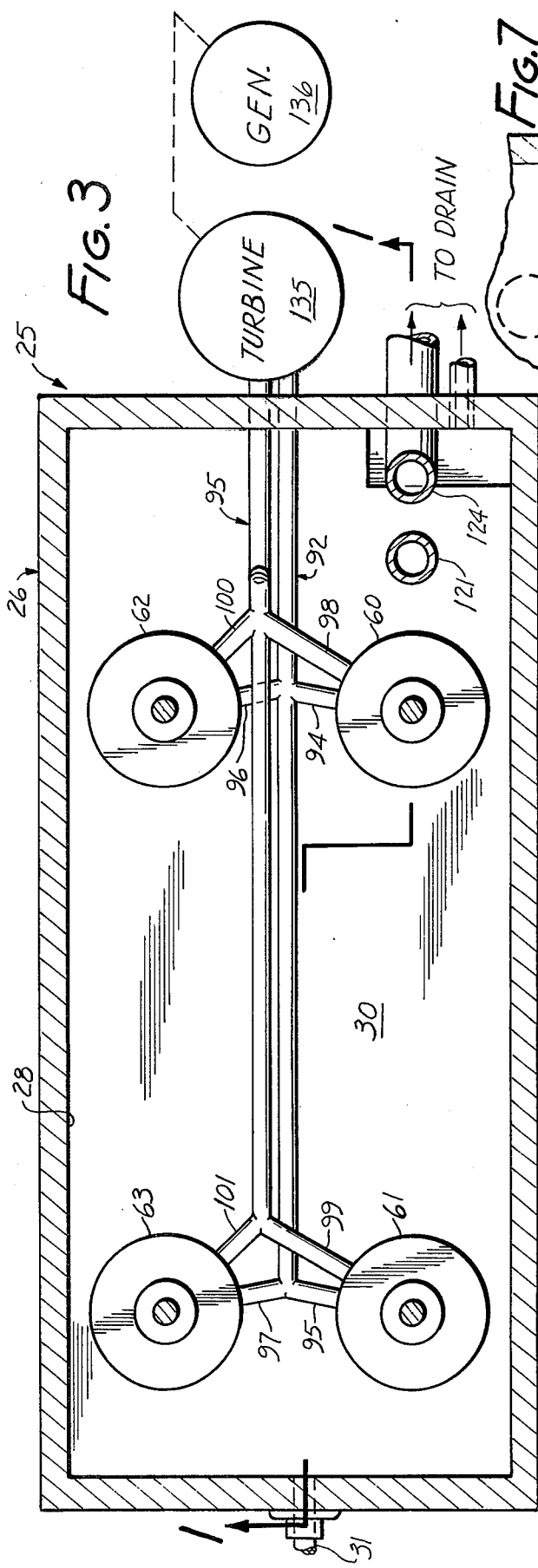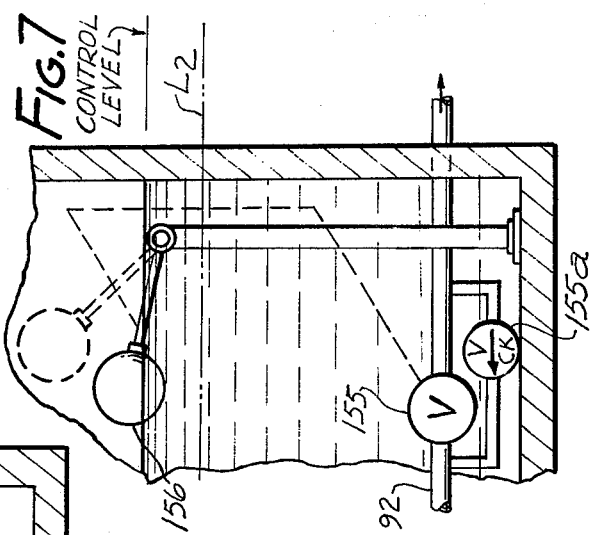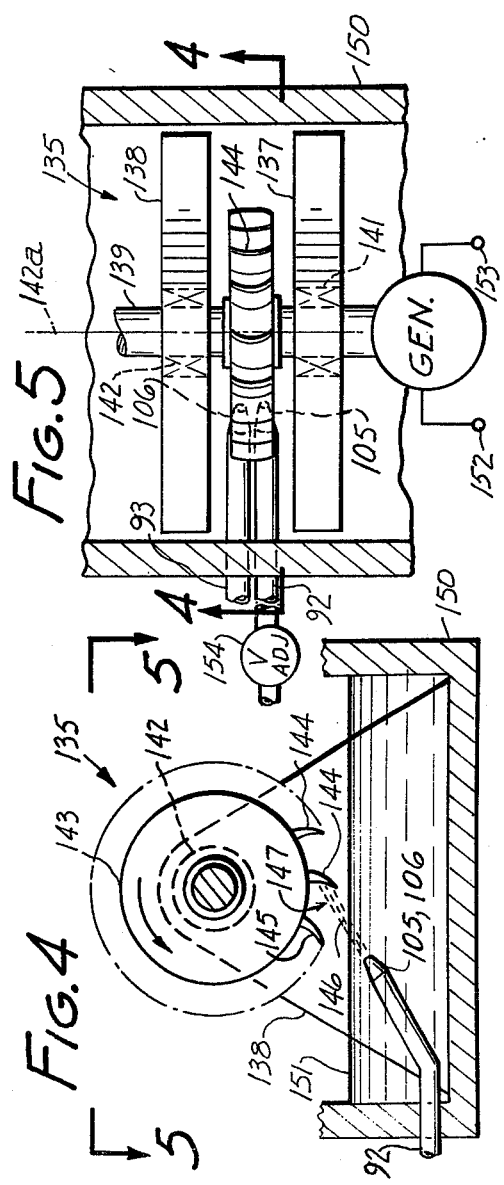

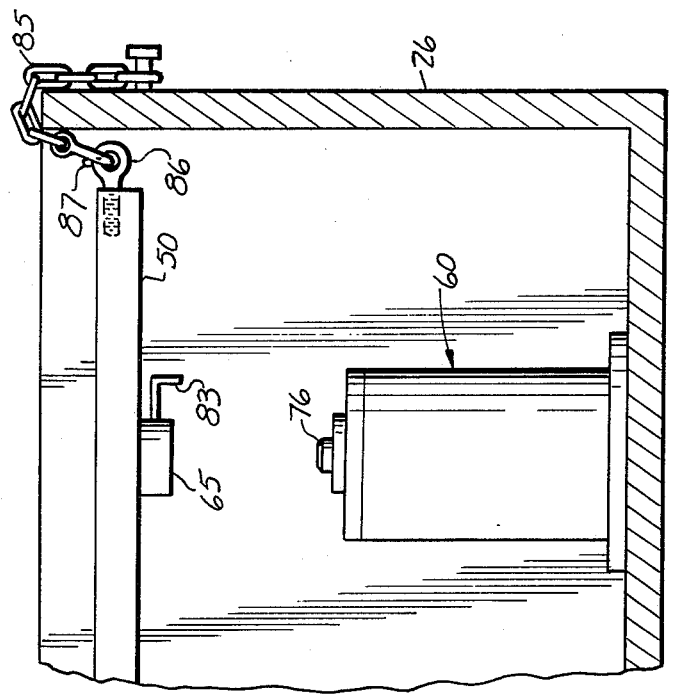
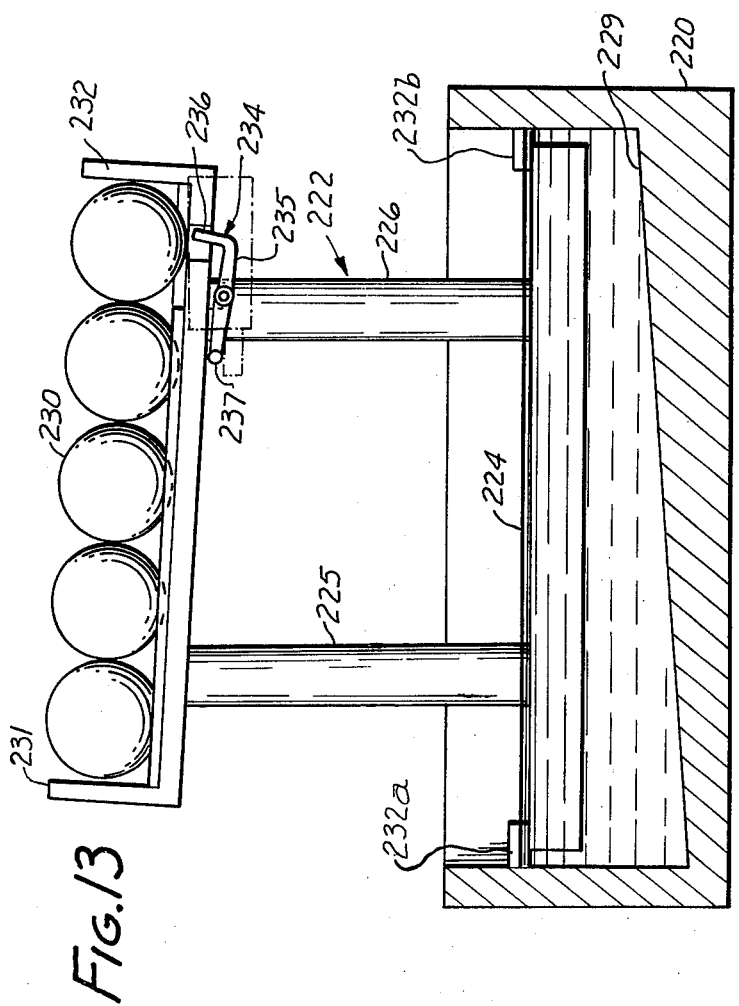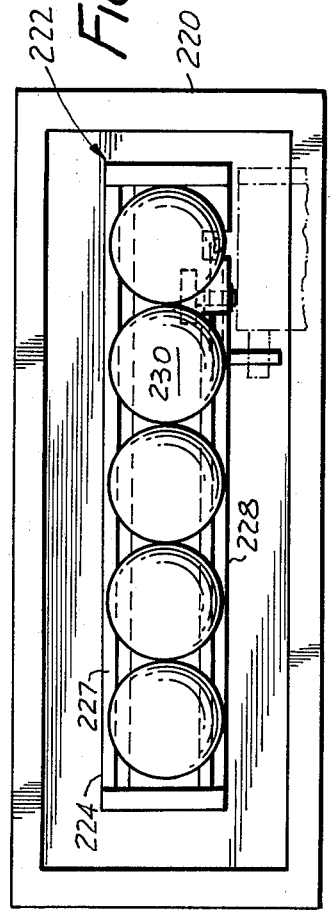

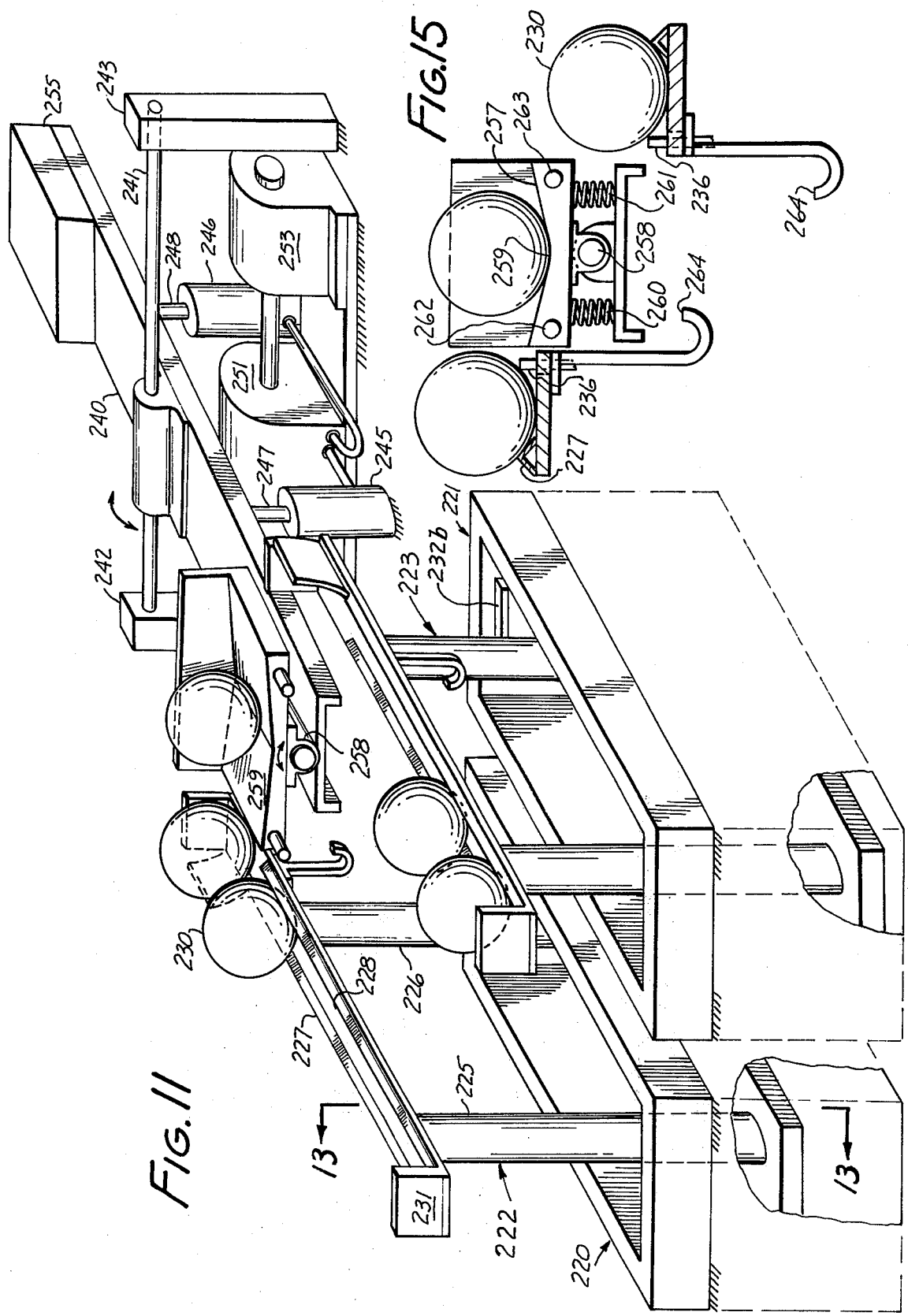

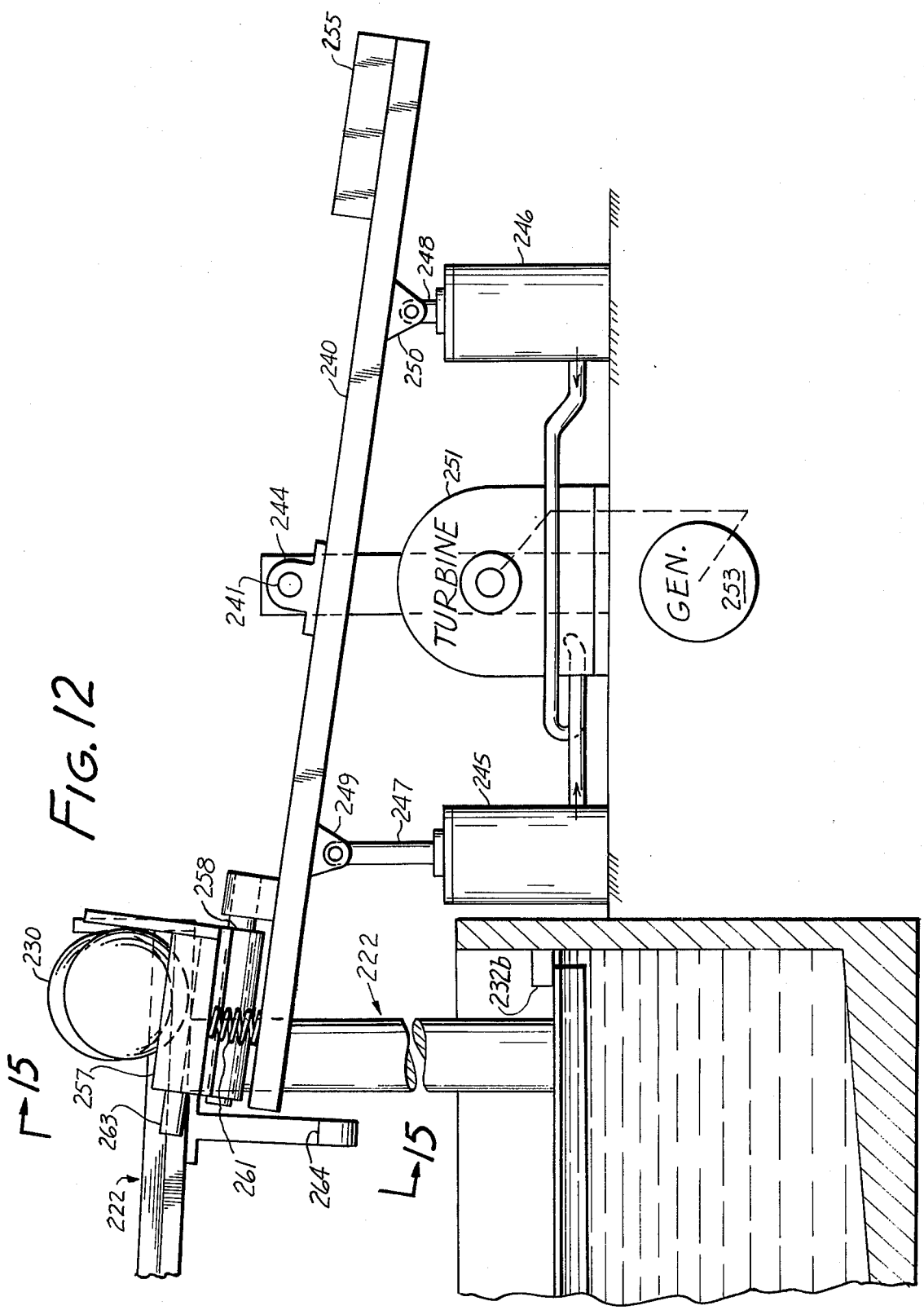

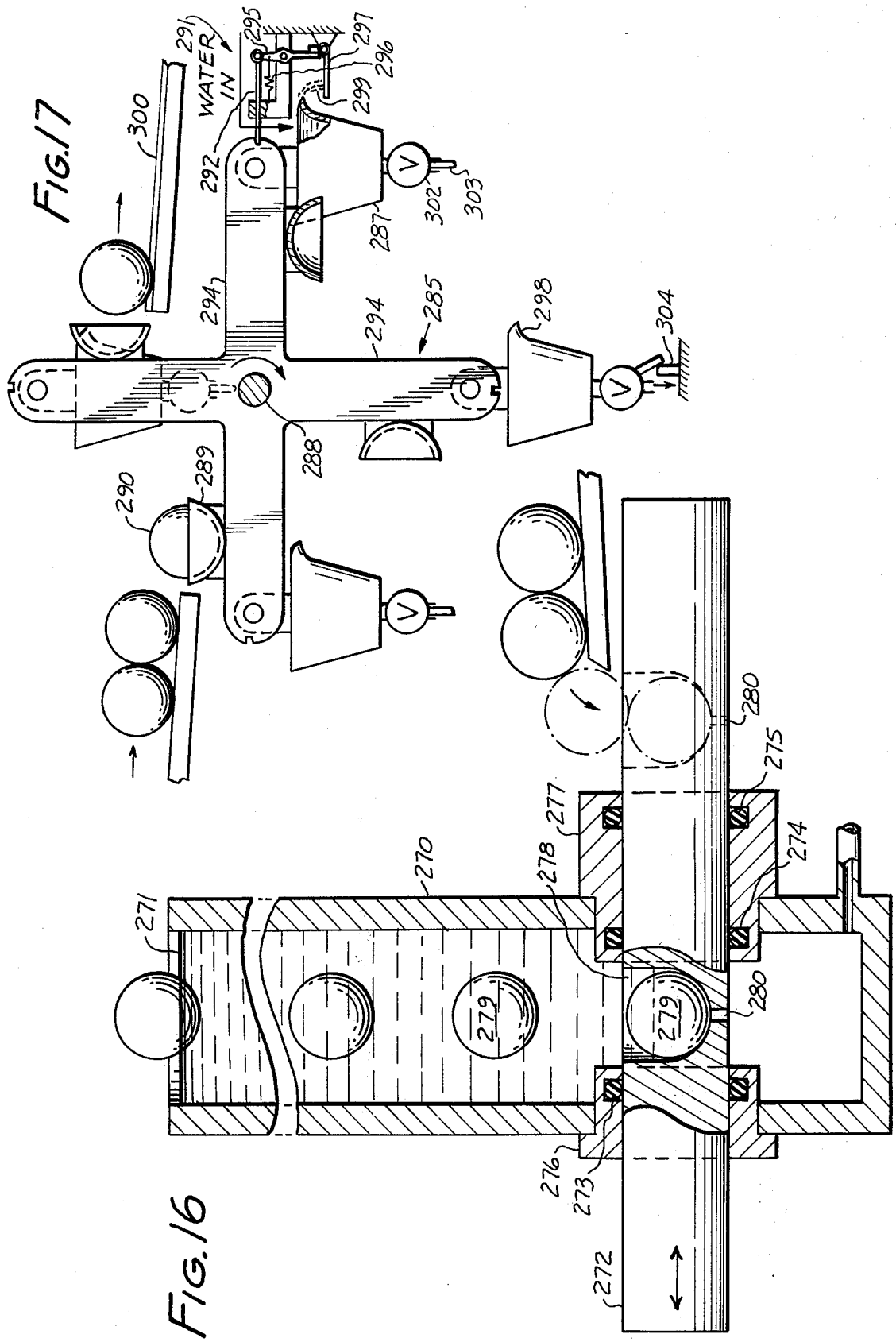

PRESSURE SOURCE AND SYSTEMS INCORPORATING IT

This invention relates to a pressure source that produces a stream of liquid under pressure. The stream can be utilized to power a rotary shaft drive such as a turbine, or a linear shaft drive such as a linear actuator, or a rotary device driven by a linear actuator through a unidirectional transmission element such as a one-way clutch. The driven element may comprise an electrical generator. The invention comprehends the pressure source, and also the systems which incorporate it.

It is an object of this invention to provide a pressure source that produces a stream of liquid at a usefully high pressure at a useful velocity, for example one which can drive a working turbine wheel, utilizing sources of energy that are ordinarily regarded as marginal or unsuitable. One example of such a source of energy is a stream having a relatively low gradient or water head at the site. Another example is a pond of tidal water trapped at high tide.

It is another object of this invention to provide a pressure source which can be constructed from conventional and common materials of construction.

It is still another objective of this invention to provide elegantly simple controls and components for the pressure source and for systems that incorporate it which require a minimum of supervision, maintenance and repair.

A pressure source according to this invention includes pressurizing means, for example a piston-cylinder assembly, to which a force is applied to expel the contents therefrom as a stream under pressure. Weight means moving from an upper to a lower elevation provides the said force. The pressure source also includes means to release, in discrete quantums of mass, the weight means for downward movement preferably, but not necessarily, without substantial impediment other than the pressurizing means. This provides sufficient force to supply a stream of fluid under a usefully high pressure.

According to a preferred but optional feature of the invention, the weight means is a buoyant body, and the pressure source includes lift means including a flotation tank in which to float the buoyant body to the upper elevation, and then to permit it to descend to the lower elevation.

According to still another preferred but optional feature of the invention, the means to release the weight means comprises a control exerted on the water level in the flotation tank.

The above and other features of this invention will be fully understood from the following detailed description and the accompanying drawings in which:

FIG. 1 is a cross-section taken at line 1—1 of FIG. 3 showing part of a system according to the invention in one condition;

FIG. 2 is a portion of FIG. 1 showing parts thereof in other positions;

FIG. 3 is a plan view of FIG. 1, partly in schematic notation;

FIG. 4 is a cross-section showing a part of the invention;

FIG. 5 is a top plan view of FIG. 4, partly in schematic notation and partly in cutaway cross-section;

FIG. 6 is a portion of FIG. 1 showing parts thereof in still other positions;

FIG. 7 is a portion of FIG. 1 showing an optional control, partly in schematic notation;

FIG. 8 is an axial cross-section of an alternate construction of pressurizing means useful in this invention;

FIG. 11 is a perspective view of still another system according to the invention;

FIG. 12 is a side elevation of a part of FIG. 11, partly in cutaway cross-section;

FIG. 13 is a cross-section taken at line 13—13 in FIG. 11;

FIG. 14 is a top view of FIG. 13 with certain parts shown in phantom line;

FIG. 15 is an end view of a part of FIG. 12 taken at line 15—15 therein;

FIG. 16 is a side view, principally in axial cross-section, showing alternative means for use in the system of FIG. 11;

FIG. 17 is a side elevation, partly in schematic notation, showing still other alternative means for use in the system of FIG. 11;

Figure 9:
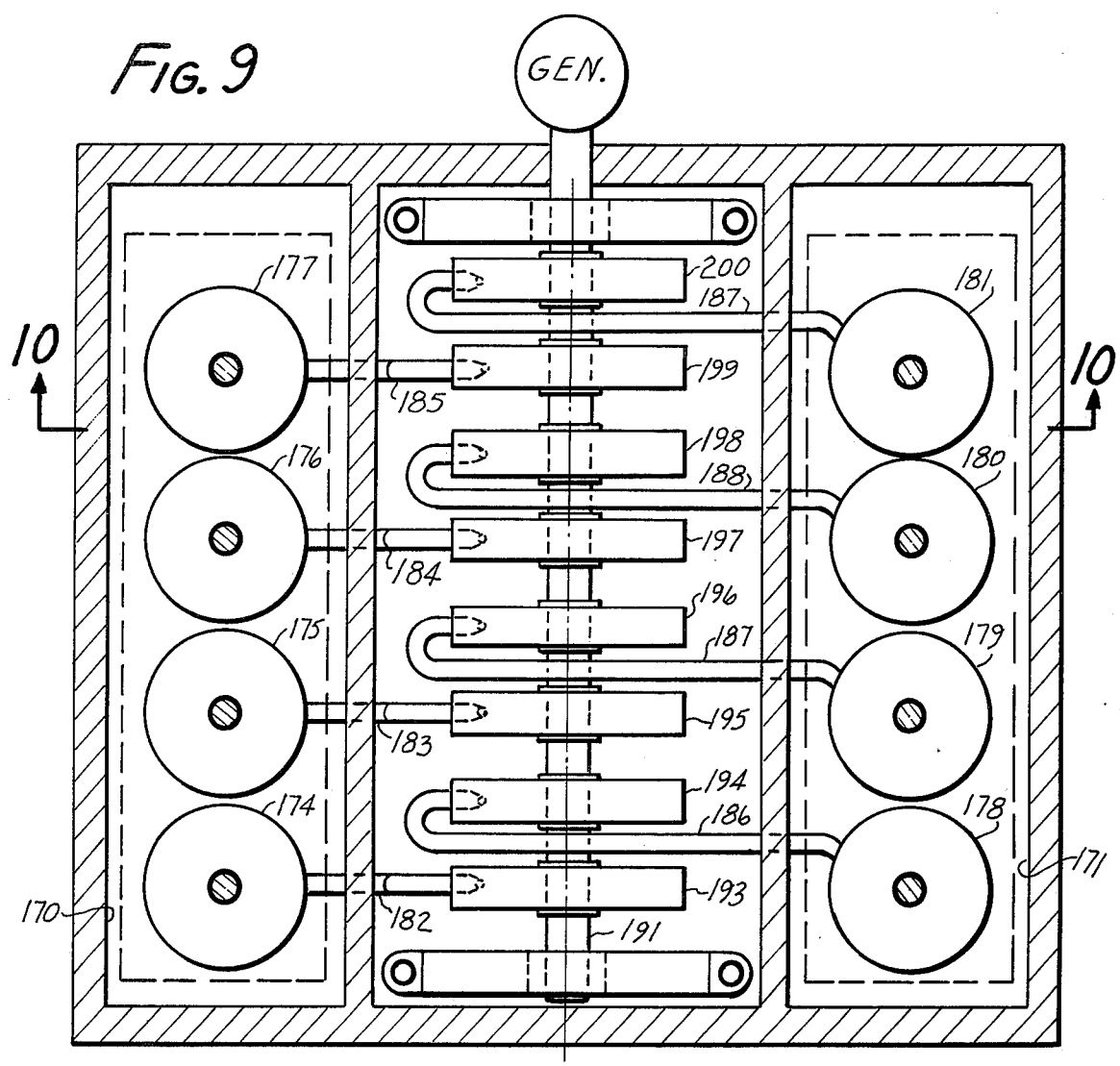
FIG. 9 is a cross-section, primarily in plan view and partly in schematic notation, showing another system according to the invention.

FIG. 1 shows the presently preferred embodiment of the invention, and the best mode of practicing the same which is presently known to the inventor. The source of energy for the system is a supply of water having an upper supply elevation and a lower drain elevation. Between these two elevations, a body having mass is raised by buoyancy and then, in a non-buoyant condition, is released so as to be applied to pressurizing means to produce a stream of liquid under pressure without substantial impediment other than the pressurizing means. The resulting stream can be used to drive a shaft drive, such as a turbine with an output shaft that can be engaged to a driven element, such as an electrical generator. In this example, the energy from the stream is converted to electricity. It is evident that other types of driven elements could instead be driven by power derived from the pressure source.

With reference to FIG. 1, a flotation tank 26 is shown which is supplied with water or other liquid from a supply 20. For operation of the system, there is an upper supply elevation 21 in the tank, and a lower drain elevation 22. When the system is operated, the water level in the tank is cycled between these two elevations. The actual placement of these elevations relative to the water supply and drain, and the differential of elevation between them, are determined by the parameters of the system, such as attainable flow rate and attainable supply and drain elevation.

The elevation 23 of the water supply must be at least as high as elevation 21, which is to say that the tank must be placed and proportioned so that the highest level expected to be reached in the tank is not higher than the supply elevation. The maximum elevation 24 of the drain must be at least as low as the lowest level expected to be reached in the tank in operation, which is to say that the tank must be placed and proportioned so that the lowest working level is not below the outside drain level, or the system would not flow.

Of course, in practice, the actual elevation 23 of the water supply will be higher than elevation 21 in the tank to provide for practical flow rates without pumping into the tank, and the elevation 24 of the drain outside the tank will be lower than elevation 22 in the tank, again to provide for practical flow rates without pumping. However, the system extracts energy as a consequence of flotation in the tank, and any head between elevations 21 and 23, and elevations 22 and 24 does not produce power. Therefore, the closer elevation 21 is to elevation 23, and the closer elevation 22 is to elevation 24, the greater will be the proportion of the available potential energy of the water supply which is connected to a pressurized system.

The system requires a supply of water and inlet conduitry which will bring the level of water in the tank to elevation 21 in a suitable period of time, and a drain level and conduitry which will drain the tank in a suitable period of time.

In a typical installation, the upper supply elevation may represent an inlet weir from a river or stream, and the lower drain elevation may constitute a return gate to the same river or stream downstream. It may also represent a storage tank filled from a stream or some other supply such as windmill-pumped water fed to a tank, or a pond of tidal water stored at high tide, later to be released to the ocean at low tide.

Importantly, in this invention supplies having comparatively low water heads on the order of as little as a foot or two can efficiently be utilized, because this invention does not utilize pressure from a stream of water of high head, such as used in common Penstock mechanisms at conventional dams, but rather a high-pressure stream whose pressure is derived from the descent of a mass which was previously raised, in the preferred embodiment by buoyant means floated in water from the supply. Any desired mass can be floated by buoyant means, and then can be used as a source of energy. This method does not require high heads of water for efficient operation.

A system 25 for the generation of power is shown in FIGS. 1 and 2. A flotation tank 26 is supported on a suitable foundation, such as the earth, at an appropriate elevation between the water supply and drain. The tank has a bottom 27, a peripheral sidewall 28, and an open top 29 which forms an open-topped flotation cavity 30.

A supply inlet pipe 31 conveys water from supply 20 to cavity 30. It may enter the tank at any elevation, and even discharge over the upper edge of the sidewall if the relative elevations permit, but less turbulence and splashing occur if the filling takes place under water. An off-on inlet valve 32 controls flow of water through pipe 31. A drain pipe 35 drains water from the cavity. It must be capable of draining the flotation tank to a level at or below lower drain elevation 22. Control over flow through the pipes will be fully disclosed below.

In the operation of this invention, the water level in the tank will cycle between upper elevation 21 and lower elevation 22. The level of the outside supply and of the ultimate drain remain substantially constant. A weight means 50 having mass is, as a total body, buoyant in water, i.e., its average specific gravity is less than that of the liquid in which it is to float. The weight means may be a body 51 made of a single buoyant material such as wood, or it may be a composite body made of both light and heavy materials, such as a combination of a steel core and a foam coating, or it may be a floatable structure, such as a hollow steel ball, or a boat which may or may not carry weights. In any event, the weight means has mass, and can be buoyantly supported in water.

For the optimum usage of a low head of water, the average specific gravity of the weight means will be close to the specific gravity of the water (fresh or sea water) in which the weight means is to be floated.

It is the objective of the water cycling to flood water into the tank so as to float and raise the weight means, and then to recede to permit the weight means to descend without substantial impediment except from pressurizing means yet to be described. In order to raise the weight means to the illustrated level, the water will have to rise to a level 21 below the top of the weight means because the buoyant structure will rise somewhat above the surface of the water. In order to permit all of the potential energy of the weight means to be recovered, the lower water level 22 will be at or somewhat below the bottom of the weight means so there will be no buoyant effect on the weight means at any time during its descent.

For convenience in disclosure, the weight means is shown as a buoyant flat slab with a planar bottom 52. Certain elevations are shown relative to an arbitrary datum line 53. $L_1$ is the minimum upper elevation of the water supply (elevation 21), and is the highest water level permitted in the tank. $L_2$ is the maximum elevation of the lower drain (elevation 22). $L_3$ is the lowest elevation of the bottom of the weight means, and $L_4$ is the highest elevation of the bottom of the weight means. There is preferably a difference, $\Delta_1$, between $L_2$ and $L_3$ which represents a small clearance between the bottom of the weight means and the water at its lowest level which assures that the weight means will not be supported by water during its downward movement. $\Delta_1$ may be zero if care is taken that water is not displaced by the weight means in its lowermost position.

There is a second significant difference in elevation, shown as $\Delta_2$, which is the difference between $L_1$ and $L_4$. This is the height the water level must rise above the bottom of the slab to lift it, i.e., this is proportional to the volume of water displaced by the slab when it floats. Therefore, the potential energy in the weight means in foot pounds is the weight of the slab times the difference between $L_4$ and $L_3$. $\Delta_1$ will be kept as small as possible, because it represents a waste of energy.

Four pressurizing means 60, 61, 62, 63 are supported on the bottom of the tank. It is convenient for them to be under water, but it is not necessary. Pressurizing means 60 and its connection to the slab are shown in detail in FIG. 1. The other pressurizing means are alike, and they are, therefore, not described individually in detail.

A socket member 65 is sunk in the bottom of the weight means. A socket 66 is formed in a sleeve 67 on the socket member. The sleeve has a cross-passage 69.

Pressurizing means 60 includes a cylinder 70 having an internal right circular cylindrical wall 71 and a pair of end plates 72, 73. A piston 74 makes a sliding, fluid-sealing fit with wall 71. A peripheral seal 75 around the piston makes the seal between the piston and the wall. A piston rod 76 is attached to or integral with the piston. It passes through a passage 77 in end plate 72. A packing 78 seals around the rod. The piston and cylinder constitute an "enclosure" which bounds a pair of chambers 79, 80. The piston and cylinder are sometimes referred to as a "first and second portion", at least one of which is movable relative to the other by means of a force applied to one of them (this is sometimes referred to as a "force applied to the pressurizing means"). In the illustrated embodiment, the force is applied to the piston. The volume of the chambers can be reduced by a force applied to the illustrated piston. Obviously, the cylinder could be attached to the rod and the piston held stationary.

A bumper 81 is placed in the bottom of the cylinder to prevent the piston from bottoming out. A collar 82 is placed atop the cylinder, against which the weight means can bear if it is not supported by water in the tank.

A removable cross-pin 83 joins the weight means to the piston rod by being inserted into cross-passage 69 in the socket member, and into a cross-passage 84 in the rod. By means of this connection, force exerted by the weight means in moving either upward or downward, is transmitted to the piston rod. The piston rod is sometimes referred to as "force transmission means", because it transmits the force from the weight means to the piston.

Cross-pin 83 can be removed to separate the weight means and the rod when maintenance is required. This situation is shown in FIG. 6, where a chain 85 that is attached to the tank is hooked to an eye bolt 86 affixed to the weight means to suspend the weight means in the air. The hook 87 is at a lower level than the uppermost level which the eye bolt reaches when the tank is full. At that time, the hook on a slack chain is engaged to the eye bolt. Then the water is drained. The weight means will descend until the level illustrated in FIG. 6 is reached, and will then be suspended by a plurality of the chains. The pin is removed, and the piston and rod will descend. The tank may be drained and maintenance can readily be performed. When the tank is refilled to a level where the weight means again floats to the upper elevation, the chains will again go slack, and the hooks can readily be disengaged so the operation of the pressure source can resume.

Pressure ports 90, 91 pass through the wall of the respective chambers 79 and 80. Each is joined to a respective manifold 92, 93. As best shown in FIG. 3, lower manifold 92 is fed by runners 94, 95, 96, 97 from the lower chambers 79 of respective pressurizing means 60, 61, 62, and 63. Upper manifold 93 is fed by runners 98, 99, 100, 101 from the upper chambers 80 of the same respective pressurizing means. Manifolds 92 and 93 are sometimes called "conduits".

Manifolds 92 and 93 discharge respective streams of water under pressure through nozzles 105 and 106 (FIGS. 4 and 5). Potential energy for this function is secured by raising the weight means buoyantly in the tank by admitting water to the tank for this purpose, and then draining the water. The deadweight of the weight means is used to reduce the volume of the lower chamber, and the weight means is preferably permitted to descend without substantial impediment other than the pressurizing means. The nozzles act as restrictions on the rate of descent, and as means for shaping the stream. It is evident that the most effective stroke of the piston is on its descent (downstroke) wherein the full weight of the weight means is effective to reduce the volume of chamber 80. A single-stroke construction may be provided in which only the downstroke is used.

In such a case, the second manifold 93 would be omitted, and the upper chamber will be ported to permit free inflow and outflow of water between the upper chamber and the tank.

However, some work can be extracted from the upstroke, even though it is considerably less than that which can be derived from the downstroke. It is derived only from the buoyant forces that lift the weight means. This work, even though less, may still be put to use. One such use is shown in FIG. 1, wherein the second manifold is used to supply nozzle 106, whose discharge stream does the same kind of service that the stream from nozzle 105 does. It might instead be used to provide pressure (or power) for auxiliary functions, such as valve or gate actuators or the like.

Cycling means is provided for alternatively admitting water to the tank and draining it from the tank so as to move the water level from elevation $L_1$ to elevation $L_2$ and return, moving the weight means through a cycle equal to a rise and fall of the difference between elevations $L_3$ and $L_4$. The function of the cycling means is to fill a low tank and to drain a full tank, and preferably to allow the weight means to descend without impediment other than the pressurizing means.

The filling function is controlled by inlet valve 32. This valve has two stable positions, open-to-flow (open), and closed-to-flow (closed). It is controlled by an actuator 110 which includes a pivoted arm 111 having a hole 112 through which a flexible cable 113 with a weight 114 at its free end passes. The cable is connected to the weight means, and passes over a pair of guide wheels 115, 116. The weighted arm of the cable rises and falls inversely with the rise and fall of the weight means in the tank.

A pair of strikers 117, 118 are fixed to the cable at appropriate positions. Striker 117 is placed so that it will move arm 111 to open the valve when the weight means is at its lowermost desired level in the tank. Striker 118 is placed so that it will move arm 111 to close the valve when the weight means has reached its uppermost desired level. The arm remains at its last position while the weight means is moving to the next of its said two levels.

Drainage to level $L_2$ can be accomplished by valving, as will later be disclosed. However, an elegantly simple drainage device is an intermittent siphon 120 (FIG. 1). This siphon has a short leg 121, a bend 122 with an upper point 123, and a longer leg 124 leading to a drain port through the side of the tank. The lower end 125 of the short leg is at elevation $L_2$, and when the water surface reaches this level, air will be drawn into the siphon, which stops the siphoning action.

Point 123 is located about at level $L_1$, and siphoning will resume when the siphon has been refilled to this level as a consequence of the refilling of the tank. The intermittent siphon has the significant advantage that no moving parts are needed.

Should more positive control of drainage be desired, then instead of using an intermittent siphon, a drain valve 130 may be placed in the same or another drain pipe 131. It may be identical to valve 32 and can be controlled by the same actuator. It is open-to-flow when valve 32 is closed-to-flow, and vice versa. Valves 32 and 130 are, therefore, in push-pull, or inverse, relationship to one another.

The combinations of valve 32 and the intermittent siphon, or of valves 32 and 130, together with any control means they utilize, is sometimes called "cycling means". Their portions which control drainage of the water are sometimes referred to as "means to release the weight means".

The term "pressure source" as used herein includes the combination of lift means (flotation tank and inlet and outlet controls), weight means, pressurizing means, and, where used, force transmission means for transmitting force from the weight means to the pressurizing means (or more precisely, to a movable portion of the enclosure that bounds the chamber). It constitutes a source of a stream of liquid under pressure which can be used as a source of power. The term "stream" is not limited to flow through a nozzle, although that is one of its connotations. Instead, it means a quantity of liquid under pressure movable so as to do work. Flow to or in a linear or rotary hydraulic actuator or motor is included in the term "stream".

FIG. 3 shows the presently preferred means to utilize the stream of liquid. It is used as a nozzle discharge in a system that includes a turbine 135 and an electrical generator 136 driven by the shaft of the turbine. Classical turbine and nozzle criteria may be employed in matching the components of the system to its output pressure and volumetric capacity. It is pertinent to note at this point that the pressure of the output pressurized stream will be substantially constant, because the piston is either driven downward by a descending deadweight of constant mass, or by an upward buoyant force on a constant mass. The nozzle dimensions are, of course, constant, and comprise the principal restriction on the rate of descent of the weight means. In fact, the weight means will be supported while falling by the upper force derived from pressure in the cylinders, and this is, of course, determined principally by the restriction of the nozzle. This is the meaning of the phrase that the descent of the weight means occurs without substantial impediment other than the pressurizing means. The weight means can descend only as rapidly as flow from the pressurizing means will permit.

Considerable simplification of the system is attained if the fluid expelled from the chambers does not have to be replenished from the flotation tank. Because these systems are intended to be as maintenance-free and rugged as possible, some minor losses in efficiency can be tolerated to achieve this objective. To achieve this objective, the chamber will be refilled with water which was previously expelled from it.

The turbine 135 is mounted to a pair of bearing blocks 137, 138 (FIGS. 4 and 5) and has a shaft 139 with an axis of rotation 140. Bearings 141, 142 mount the shaft for rotation around its axis of rotation 142a. A bucket wheel 143 is fixed to the shaft, and includes a procession of buckets 144 having drive surfaces 145 spaced apart around the said axis. When the bucket wheel and shaft rotate, the drive surfaces successively cross the path 146 of the stream 147 emitted from the nozzle, and the turbine wheel is thereby driven. This class of turbine can be used with or without the water supply feature described in the next paragraph.

A water-filled pan 150 is placed beneath the turbine wheel, and the nozzle or nozzles is or are submerged just beneath the surface 151 of the water. The nozzle port is not so deep as seriously to impede or destroy the shape of the nozzle stream—it readily breaks through a reasonable depth of water, such as ¼ to ½ inch for many practical streams, to impinge upon and drive the turbine wheel when the volume of the respective chamber is being reduced. When this piston is on its return stroke for the respective chamber, water will be drawn into the chamber from the pan through the nozzle, rather than through valving systems from the tank into the cylinder. This can constitute a considerable simplification of construction. Of course, valving systems to admit water to the chambers from the flotation tank, and to preclude backward flow through the nozzles during the intake stroke, can readily be devised by persons skilled in the art should one wish to use them. Then submersion of the outlet end of the nozzle would not be required.

The two sets of nozzles may discharge side by side, or against separate wheels fixed to the same shaft, as preferred.

Generator 136 is conventional, and provides electrical potential at its output leads 152, 153. Conventional speed controls or brakes may be used to regulate the turbine speed, or, if desired, an adjustable valve 154 may be placed in the manifold to adjust the rate of flow to the turbine independently of the nozzles. Also, the angle of attack of the stream against the buckets can be adjusted on an intermittent or running basis for speed regulation.

The attainable flow rate through the drainage means should be sufficiently fast that the water will recede below the bottom of the weight means as quickly as possible. Then the force of the downward stroke will not be reduced by buoyancy. It is a substantial advantage of this invention that the full constant downward force of a lifted weight can be applied to the pressurizing means. If the outflow rate is sufficiently great, a small overlap of downward movement and buoyant lift at the top of the stroke is not intolerable, because the water level will be underneath the weight means before the weight means has fallen very far. Also, some overlap at the bottom of the descent is tolerable. Both situations are within the scope of the invention. If one wishes to avoid overlap at the upper elevation, then a level-sensing valve 155, such as an off-on ballcock valve (FIG. 7), can be placed in the manifold 92 so as to prevent flow through the manifold until the water level in the tank has fallen to some control level well below the weight means and well below the upper elevation. FIG. 7 shows a float 156 in such a valve pivotally mounted near a control level where, when the water level is above the control level, it will rise to the position shown in dashed line and close valve 155 to prevent flow through the manifold. Then liquid trapped in the chamber 79 will support the weight means and prevent its descent. When the water level has fallen to the control level, the float will have moved to the position shown in solid line. The valve will then be opened, flow through the manifold can start, and the weight means can descend. Valve 155 thereby constitutes means to release the weight means for descent when the water level has lowered to an agreed elevation, usually beneath the weight means.

FIG. 8 illustrates that constructions other than piston-cylinder assemblies are useful as pressurizing means. A diaphragm pump construction is shown in this FIG. which includes a cylinder 160 closed at its top by an elastic diaphragm 161. A plunger 162 is fixed to rod 76 of FIG. 1 instead of a piston, and the two limiting positions of the diaphragm are shown. The upper dashed line position is the relaxed condition of the diaphragm. The weight means is fully raised at this time. The solid-line position is assumed when the weight means has descended to its lower limit. The chamber 163 has a variable volume which is reduced when the diaphragm ("movable portion") is moved downwardly. The cylinder and the diaphragm comprise an enclosure and also the two portions, at least one of which is movable. The fluid flow is the same as that from chamber 79 in FIG. 1 wherein a piston and cylinder are used.

Should water from the tank be used to supply water to the pressurizing means, then the chambers will be provided with another port having a unidirectional check valve permitting flow of liquid into the chamber from the tank cavity, but not the reverse, and another unidirectional check valve in the manifold, permitting flow toward the nozzle, but not the reverse. The pressurizing means would then act as a common unidirectional pump. In addition, the relative elevations would be selected to prevent gravity flow through the two check valves.

The embodiments heretofore described have provided a major stream on the downward movement of the weight means, and optionally a second, lesser, stream on the upward movement thereof. The use of a single-tank pressure source in this manner relies on a flywheel inertial property in the system downstream of the nozzles to keep running until the next downward movement of the weight means. While this is a valid method of operation, improved performance will usually result if two or more tanks are used sequentially so that there is little or no interval between pressure streams at the nozzles. One such arrangement is shown in FIG. 9.

In FIG. 9, there are shown two tanks 170, 171, each with respective weight means 172, 173, four pressurizing means 174–177 and 178–181, and conduits 182–189 leading to the individual nozzles. Only nozzle 190 is shown, the others being parallel to and behind it or hidden by it in FIG. 10. The nozzle arrangements may be as previously described below or out of water depending on how water is supplied to the chambers. Weight means 172 and 173 are buoyant.

A shaft 191 has a horizontal axis of revolution 192. There are eight turbine wheels 193–200 fixed to this shaft. Each wheel has buckets with drive surfaces which successively intersect the stream of liquid from the respective nozzle to drive the shaft as in FIGS. 1–4. This FIG. also illustrates that the outputs from the pressurizing means need not be manifolded, but instead can be discharged from individual nozzles to individual wheels rather than to a single turbine wheel, if preferred.

The details of the water supply and drains, and of the cycling means, will not be repeated here. Construction and considerations identical to those used in the system of FIG. 1 will be used. There is shown, however, a means for preventing the simultaneous filling of the two tanks, which, assuming proper overall system design and proportioning will also substantially synchronize the operation of the two tanks so that one is lifting its weight means while the weight means is descending in the other, and vice versa. This control is a selector valve 205 disposed in the inlet pipes 206, 207 from the water supply to the respective tanks. Selector valve 205 is under the control of one of the weight means the same as inlet valve 31, and valve 205 is sometimes referred to as an inlet valve for both of tanks 170 and 171. It is solely under the control of weight means 172, and therefore, tank 171 acts as a slave to tank 170, filling only when tank 170 is not filling; that is, selector valve 205 directs the flow alternately to one tank or the other. The drainage of the tanks will be alternated imilarly, using slave valving, i.e., valves such as valve 130, also under the same inverse control, or the intermittent siphons, as preferred.

Figure 10:
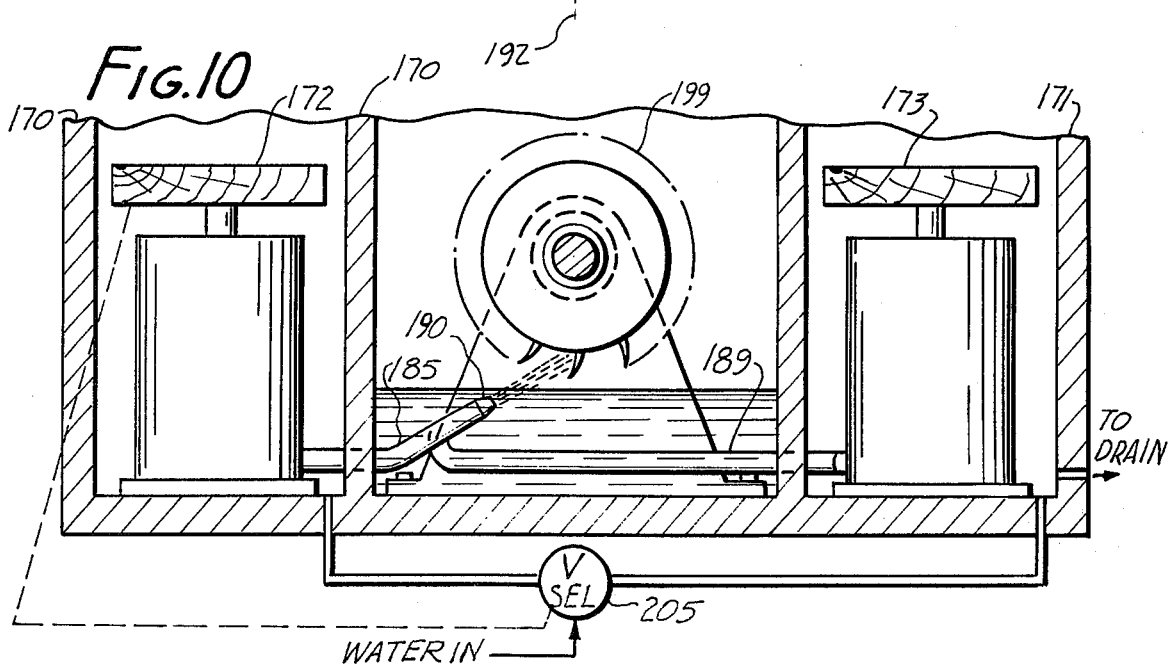
FIG. 10 is a cross-section view taken at line 10—10 in FIG. 9.

The foregoing is only one example of means sequentially to operate two tanks. More than two tanks can obviously be used and the weight means of one or more can be raised and held at the upper elevation, pending its turn to descend. Other sequencing means, and even manual means, can readily be devised by a person knowledgeable in this art, and no further discussion will be given here. Suffice it to say that FIGS. 9 and 10 show means for the sequential operation of a plurality of sets of pressurizing means to provide a substantially constant source of fluid under pressure to a turbine or other means which utilizes the stream from the pressurizing means.

In FIGS. 1–10, the lowering of weight means, and sometimes also their raising by buoyancy, is used immediately and continuously to drive a shaft by means of a turbine wheel or other device. This quite closely couples the operation of the tanks to the operation of the shaft drive. It is possible to de-couple these, and still to use the water (either buoyantly or by other means yet to be described) to raise weight means, and accumulate the weight means at an upper elevation to be lowered individually afterward at intervals and times which have no necessary correlation with the flow of water used to lift the respective weight means in the first place. One such system is shown in FIG. 11.

In this system, two tanks 220, 221 are provided with the same cycling controls as shown and suggested above for raising and lowering the water level therein. Similar supply and drainage provisions are made, and the descriptions and illustrations thereof will not be repeated.

Lift means 222, 223 is provided in each tank. Because these lift means are mirror images, only lift means 222 will be described in detail. It is shown in FIG. 13. Lift means 222 includes a buoyant body, such as a float, a tank, or a barge 224. Risers 225, 226 support a pair of parallel rails 227, 228. When the float is level, the rails slope downward and to the right in FIG. 13. A slope 229 is formed on the bottom of the tank with its highest part at the right in FIG. 13. Its slope is double that of the rail. It is the function of the buoyant body to receive balls 230 ("weight means") on the rails at a lower elevation and lift them to an upper elevation where they can be stored and used at leisure, or at a closely coupled rate, if preferred.

When the buoyant body rests on the bottom of the tank, its rails slope downward and to the left in FIG. 13. The balls then roll against a stop 231. When the float rises and is level, the rails slope downward and to the right so they will roll off. A stop 232 holds the loaded balls on the track until time for their release. Rails 232a, 232b restrain the float in a level position at the upward limit of its travel, and the fewer balls there are aboard, the greater the buoyant force against the rails for this purpose. A portion 233 of rail 228 is eliminated so the ball can roll off the body sidewise. A gate 234 prevents this movement until it is desired. This gate comprises a pivoted arm 235 with a finger 236 which, when elevated, prevents the ball from rolling off. A contactor 237 on the arm is adapted to strike an actuator pin, yet to be described, to lower finger 236 and let one ball roll off at a time.

The power source of this embodiment also includes a beam 240 that is pivotally supported by a cross-shaft 241. The cross-shaft in turn is supported by a pair of posts 242, 243. A bearing 244 mounts the beam to the cross-shaft. The bearing is fixed to the beam.

Two pressurizing means 245, 246 rest on a foundation. They include rods 247, 248, respectively, which are pivotally pinned to yokes 249, 250 carried by the beam. Rocking of the arm will reciprocate the rods up and down, and actuate the pressurizing means. Any of the pressurizing means heretofore described may be used for pressurizing means 245, 246, and they will not be further described. Conduits 247, 248 lead to respective nozzles (not shown) which deliver a stream of liquid under pressure. If the underwater type of discharge of nozzles shown in FIG. 4 is not used, then other means to replenish the water expelled from the pressurizing means must be supplied. These also have been separately discussed. A suitable example would be submerging the pressurizing means in respective tanks and keeping these tanks filled as a source of water, just as was described for the systems in FIGS. 1–10.

Similarly, a drive 251 comprising a turbine of the type described above is driven by the stream, and drives an electrical generator 253.

A counterweight 255 is placed at one end of the beam. It will be lighter than the individual balls. For example, if each ball weighs 1000 lbs., the counterweight should weigh 500 lbs., when each is the same distance from the cross-shaft (acting as a fulcrum). When a ball is on the other end of the beam, there is a net torque of 500 lbs (the 1000 lb. ball minus the 500 lb. counterweight) times its distance from the shaft in a counterclockwise direction. When the beam has reached the lower limit of its motion, the ball rolls off onto the other lift means, which is resting on the bottom of its own tank. Then there is a net torque of 500 lbs. times the distance from the shaft exerted by the counterweight in a clockwise direction, and the beam rotates clockwise. A rocking motion can thereby be developed by sequentially loading and unloading balls from the left-hand end of the beam in FIG. 12.

If the balls are to be stored and not used by the beam directly from the rails, the balls can be rolled off onto storage racks (not shown), and used from there in the same manner. In either event, means will be required to load and unload the ball on and off the beam. Such a means is shown in FIGS. 12 and 15. Gate 234 on lift means 222, and a like gate (not shown) on lift means 223 will adjoin the end of the beam when the beam is in the respective upper or lower position. The beam carries a rocking saddle 257. The saddle is mounted to a trunnion 258 and has a trough 259 to receive a ball and cradle the ball when the saddle is centered by centering springs 260, 261. Actuator pins 262, 263 project from the saddle. As best shown in FIG. 13, the actuator pin can strike a contactor when the beam is in its raised condition to open the gate and permit a ball to roll onto the saddle from rails at their uppermost elevation. A stop 264 is attached to the buoyant body and disposed at a lower elevation to catch pin 262 and rock the saddle to spill the ball onto a set of rails at a lower elevation. A duplicate gate and stop is provided on the other set of rails to function when the other set is high and the first set is low. Thus, the balls can be cycled back and forth from one buoyant means to the other as they are alternatively raised and lowered.

Loading of balls onto the beam from a stationary platform, and unloading them onto rails or platforms, can be performed in the same way. Loading and unloading of balls onto and off of the rails from the platforms may also be analogously accomplished. The pertinence of this system is that, as contrasted with the systems of FIGS. 1–10, the tank can be raising weight means with a different frequency than is utilized by the pressurizing means.

The systems of FIGS. 1–10 illustrate that the buoyant means for lifting a mass (weight means) can be a buoyant mass itself which is directly used while in a tank to drive a pressurizing means.

The system of FIG. 11 illustrates that the buoyant means can be used to lift different and separate weight means which may be non-buoyant.

The system of FIG. 16 illustrates that inherently buoyant weight means for use away from the flotation tank can be buoyantly lifted by means which do not require a cyclic raising and lowering of a water level. In FIG. 16, a tank 270 (it may be a cylindrical standpipe) is supplied with water to an upper level 271. At a lower level, an injector slide 272 passes diametrically across the tank and makes a sliding fit therein. Seals 273, 274, 275 in fittings 276 and 277 seal around the slide to prevent leakage past it. The slide has a pocket 278 to receive buoyant balls 279 (weight means). The fittings are longer than the pockets, and the spacing between seals 273 and 274 is also longer to minimize water loss. A drain port 280 drains the pocket when outside of the tank.

To inject a ball into the tank, the ball is first loaded into the pocket while outside of the tank, and the slide is shifted to move the pocket inside the tank, where the ball floats to the top. The slide is then moved to place the pocket outside the standpipe to receive the next ball. An amount of water at least equal in volume to that of the ball is lost from the tank for each cycle and must be made up to maintain the water level in the tank. Only the energy needed to overcome functional losses needs to be exerted on the slide to inject the balls. The balls are removed from the tank at the upper level through locks (not shown).

FIG. 17 illustrates that weight means for use in a system such as that shown in FIG. 11 can be raised by a water lift but without utilizing its buoyancy for the purpose. For this objective, lift means 285 comprises a conventional bucket wheel 286 having buckets 287 swively mounted thereto to receive water at an upper elevation and dump it at a lower elevation. The wheel is rotatably mounted to a shaft 288. The wheel also carries ball supports 289, and receives balls 290 (weight means) at a lower elevation and dumps them onto a platform at an upper elevation for usage in a system such as that shown in FIG. 11.

A latch 291 (release means) holds the bucket wheel against rotation until enough water has been placed in a respective bucket to lift the ball. Then it releases the wheel to allow it to lift the ball. The latch includes a latch pin 292 which is movable into and out of the path of a latch groove 293 on each arm 294 of the wheel. A lever 295 pinned to the latch pin can withdraw it against the tension of a spring 296 when a trigger 297 rotates under the weight of water spilled from a full bucket for this purpose.

The bucket has a lip 298 which spills water 299 onto the trigger (or into a cup held by the trigger) so that the weight or force of the water rotates the trigger counterclockwise in FIG. 17 to pull the latch pin. The weight of the full bucket will turn the wheel, and raise a ball 290 in the ball support to the upper level of a ramp 300 which receives it. The arms act as levers around shaft 288, which acts as a fulcrum.

A dump valve 302 in the bottom of each bucket includes a valve actuator 303 which hangs vertically to keep the dump valve closed except when the bucket is at the bottom of the wheel. There it contacts a fixed striker plate 304, and is deflected sideward to open the valve and drain the bucket.

Figure 18:
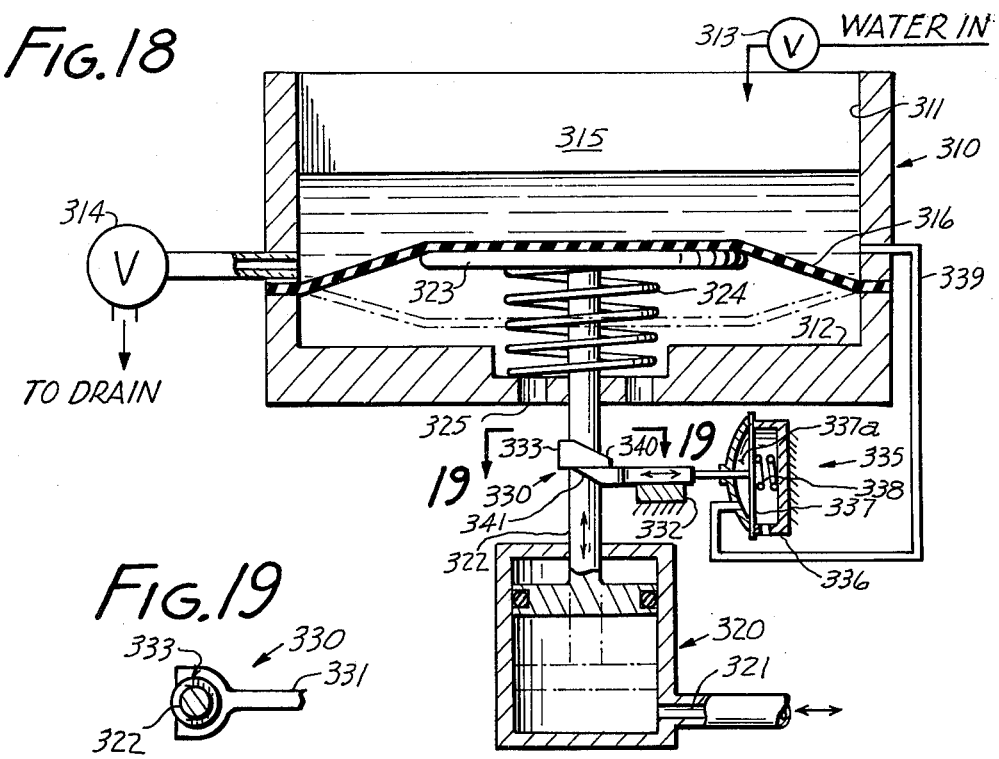
FIG. 18 is a side elevation, primarily in axial cross-section, of another embodiment of the invention.
Figure 19:
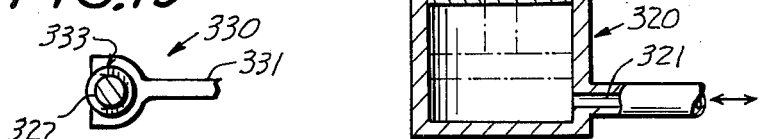
FIG. 19 is a cross-section taken at line 19—19 of FIG. 18.

FIGS. 18 and 19 illustrate that the container for water need not itself change elevation when water is used as the weight means, but only the body of water itself. In this embodiment of pressure source, a tank 310 has a peripheral sidewall 311 and a bottom 312. An inlet valve 313 and an outlet valve 314 control flow into cavity 315 formed above a flexible diaphragm 316 that extends across the cavity above the bottom. The water rests on this diaphragm.

The diaphragm can assume an upper position shown in solid line, and a lower position shown in dashed line. A pressurizing means 320 is identical in all respects to those described above. It discharges into a conduit 321 which can be any of the conduits or manifolds previously described to receive a stream from the pressurizing means.

Rod 322 constitutes force transmission means, and includes a backing plate 323 which underlies the central portion of the diaphragm and is backed up by a return spring 324. Spring 324 is in compressive opposition between the bottom of the tank and the backing plate. Vent ports 325 vent the region in the tank below the diaphragm.

A latch (release means) 330 includes a forked yoke 331 which slides on a base 332 and, in its position shown in FIG. 18, embraces the rod below a collar 333 that is fixed to or is part of the rod to hold the rod and diaphragm in an upper position.

A force actuator 335 includes a body 336 and a flexible diaphragm 337 extending across the body to form a closed chamber 337a. The diaphragm is opposed by a spring 338 which biases the yoke to the illustrated locked position. A pressure conduit 339 interconnects the region of the tank just above the diaphragm to chamber 337a so that, when a predetermined amount of water is placed in the tank, the pressure conduit transmits the respective pressure to the chamber, and moves the diaphragm to pull the yoke away from the rod, and the rod can move downward. The compression in the spring can be adjusted to select the said pressure.

A wedge face 340 is formed on the top of the collar, and another face 341 on the bottom of the yoke so as to shift the yoke aside when the collar is raised past it.

Figure 20:
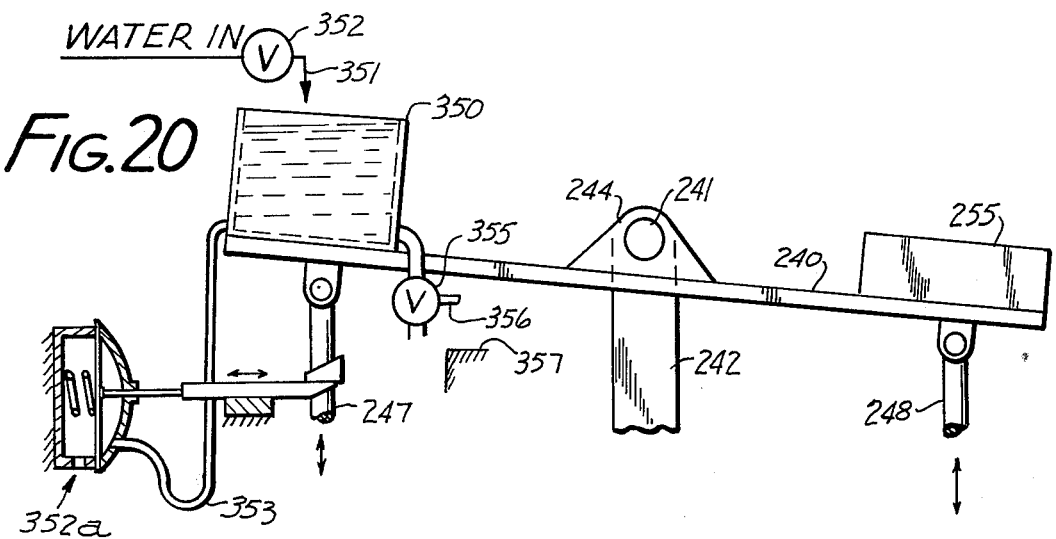
FIGS. 20 and 21 are fragmentary side elevations, partly in cutaway cross-section, showing still other embodiments of the invention.

FIG. 20 illustrates the direct usage of water as weight means. It is shown actuating a pressure source of the same type as shown in FIG. 11, and like parts are given like numbers. However, instead of having means to receive discrete balls as weight means, a container 350 is mounted to one end of the beam, where it receives water either in continuous flow from a supply line 351, or through an inlet valve 352 in the supply line.

Latch means 352a identical to that shown in FIG. 18 is provided to hold the beam in the position shown in FIG. 20 until a predetermined amount of water is placed in the container. A flexible hose 353 connects the container to the latch means to transmit the pressure for pulling the yoke. The hose is long enough to accommodate the full stroke of the beam.

A drain valve 355 has an actuator 356 which will open the valve and dump the container at the bottom of the stroke upon striking an abutment means 357.

Figure 21:
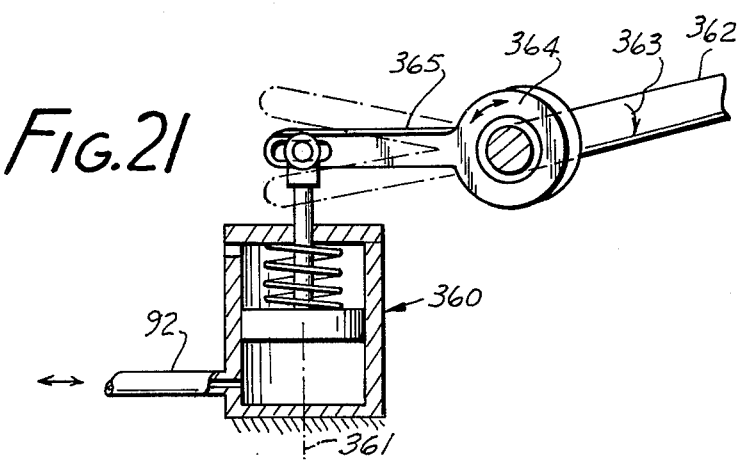

FIG. 21 illustrates that the pressure source can drive devices other than rotary devices. Manifold 92 is shown connected to a linear actuator 360. The best known form of linear actuator is a piston-cylinder assembly. Its rod (or shaft) moves linearly along a linear axis 361, and this may be used directly as a shaft drive. It may also be used to drive a rotary shaft such as shaft 362 which rotates unidirectionally as shown by arrow 363 by the interposition of a unidirectional transmission means 364 such as a one-way clutch. Therefore, oscillating arm 365 will rotate shaft 362. Shaft 362 could be such as the drive shaft of an electrical generator.

The operation of the foregoing should be evident from their description, so only a brief recapitulation will be made. In the system of FIG. 1, operation is started by closing the drain valve, if one is used (the intermittent siphon needs no attention), and opening inlet valve 32. Water from the supply will flow into the tank and lift the buoyant weight means. Striker 118 will cause valve 32 to close when the proper water level is reached. When an intermittent siphon is used, the siphon should start to flow at this time if it is properly adjusted and proportioned. if a drain valve is used, it will be opened. This will permit water to leave the tank and recede from the weight means.

It is possible to eliminate the inlet valving if the rate of inlet flow is slow enough as not to impede the operation of the pressurizing means. However, such continuous flow does constitute a waste of potential energy.

If the rate of drainage is sufficiently high and the rate of descent of the weight means sufficiently low, the manifold or manifolds need not be provided with valving to hold the weight means against descent until releasing them for descent after the water has receded to a suitably low elevation. A minor overlap of weight descent and receding water is undesirable, but not intolerable. After the water has receded below the weight means, the pressure in the pressurizing means is dependent only on manifold and nozzle conditions, and the deadweight of the weight means. It is substantially constant, and this is a considerable advantage in operating turbine wheels, because the pressure and flow rate of the stream can be adjusted to optimum conditions.

The operation of the turbines in FIGS. 4 and 5 is conventional. The buckets sequentially intersect the stream and are driven by it. A generator or other device can be directly coupled to the driven shaft of the turbine.

The refilling of the pressurizing means through the nozzle is evident from FIG. 4.

FIG. 5 shows the usage of pressure streams from both chambers 79 and 80 to drive a turbine wheel. The lesser flow from manifold 93 could, instead, be accumulated and used for auxiliary functions, if preferred.

In FIG. 7, valve 155 will close its respective conduit or manifold until the water in the tank has receded to a control level. Then it will open to allow flow from the chamber. Until this valve (when used) is opened, the weight means cannot descend. A one-way check valve 155a permits flow toward the chamber on its intake stroke even when valve 155 is closed. This is another means to restrain the weight means until the water has receded below it so as to assure that there is no buoyant force resisting the descent of the weight means.

The pressurizing means of FIG. 8 can be used wherever a piston-cylinder assembly can be used.

The operation of the individual pressure sources in FIGS. 9 and 10 is identical to that of FIG. 1. FIGS. 9 and 10 merely illustrate the sequential operation of a plurality of them in driving a common turbine shaft. The selector valve 205 provides for alternate (or sequential) filling of the flotation tanks.

In FIG. 11, one of the flotation tanks will be filled and the other emptied. Then balls from the raised lift means are released, one by one, to the end of the beam when it is up and adjacent to the rails. The gate will release a ball at a time as previously described. The ball will force the end of the beam downward until it reaches the level of the lower rails, at which time the saddle is tilted to roll the ball off of the saddle and onto the lower rails.

When all of the balls are removed from the upper rails, the respective tank is drained and the buoyant body will rest on the bottom awaiting a new supply of balls to be lifted. The other tank is filled to raise the balls and provide a new supply. The process continues indefinitely. The operation of the individual components should be evident from their previous description.

The lift means of FIG. 16 operates as previously described. The slide takes relatively little energy, because there are no unbalanced end forces on it. Energy from manifold 93 would be a suitable source to operate the slide.

The lift means of FIG. 17 operates as previously described, and lifts a ball each time a bucket is filled with water. The relative spacing of the cups and buckets along the arms of the wheel can be adjusted to provide lesser, additional, or no, leverage, as desired.

In FIG. 18, water is charged into and drained out of the tank 80 as to change the level of the backing plate and run the pressurizing means. In this embodiment, release means is of particular utility. The release means shown in FIG. 18 is the mechanical equivalent of a valve downstream from the pressurizing means. It may be used in place of the valving and control of FIG. 7, and the valving and control of FIG. 7 can be used in place of the mechanical latch. Both comprise "release means."

After the cavity has been filled to the proper level, the release means permits the rod to descend, applying force to the pressurizing means. Then, at the end of the descent, the cavity is drained. The return spring returns the diaphragm to the upper position, the cavity is refilled, and the cycle is repeated.

The pressure source of FIG. 20 directly utilizes the weight of water, rather than using the water to lift a solid mass. Except for this difference, it operates in the same manner as the system of FIG. 11.

FIG. 21 is a further illustration of the general utility of the pressure source.

The term "force transmission means" as used herein means any interconnection or linkage which transmits force from the weight means to the pressurizing means.

In the operation of pressure sources wherein a buoyant body descends in the flotation tank to drive the pressurizing means, it is preferable to keep the water level below the bottom of the weight means while it descends so the force is proportional only to the mass of the weight means. Such operation is totally analogous to the lowering of a ball in the air in FIG. 11, or of the body of water in FIG. 18. It has the advantage that the downward force is not diminished by an upward buoyant force. This class of operation is described by the terminology "releasing, in discrete quantums of mass, weight means for downward movement without substantial impediment other than the pressurizing means."

However, it is possible, although not desirable, to lower the water level at some rate which is equal to what will be a lesser rate of descent, partially supporting the weight means of buoyancy. The net effect of such operation is to exert a lesser downward force, an operation which is equivalent to using a lighterweight means in the first place. Therefore, this is analogous to adjusting the mass of the weight means. Such a method of operation, and the mechanism to carry it out, are also included in this invention. It constitutes a control of the rate of flow to drain.

The term "discrete quantum of mass" connotes the fact that this pressure source is not intended to operate unless there is a predetermined weight which will produce a predetermined pressure in the pressurizing means. This system utilizes the deadweight of a mass, rather than a head of liquid, or the velocity of a stream, for energy. Therefore, its energy supply is, in one way or another, accumulated as an elevated mass in a desired quantum before the pressurizing means is operated.

The term "tank" is used in its broadest sense to mean any structure or arrangement wherein the depth of water can be varied so its surface rises and lowers.

The lift means which have been described all use water to raise a weight, or use already-raised water directly. It is evident that lift means for use with this pressure source could use other types of energy, such as windmills to pump water or directly geared to lift weights.

This invention is not to be limited by the embodiments shown in the drawings and described in the description, which are given by way of example and not of limitation, but only in accordance with the scope of the appended claims.

I claim:

1. A pressure source comprising: pressurizing means comprising an enclosure which bounds a chamber, said enclosure comprising a first and second portion, at least one of which is movable relative to the other as a consequence of a force applied to one of them so as to reduce the volume of the chamber and thereby to place under pressure liquid which is contained therein; a conduit leading from said chamber through which a stream of said liquid under pressure can flow for use in doing work; a flotation tank adapted to contain liquid at an upper and at a lower elevation; weight means floatable buoyantly in the liquid in the flotation tank; force transmission means so disposed and arranged as to apply force from elevated weight means to said one portion cycling means for controlling the supply of liquid into, and the drainage of liquid out of, the flotation tank so as respectively to raise the weight means and to permit it to descend; and release means to delay the descent of the weight means whereby the weight means can descend at a rate which is independent of the level of the liquid in the flotation tank.

2. A pressure source according to claim 1 in which the release means releases the weight means only in discrete quantums of mass of at least a predetermined weight.

3. A pressure source according to claim 2 in which said release means is a valve in the conduit.

4. A pressure source according to claim 3 in which level-sensitive means actuates said release means in response to receding of the level of the liquid in the flotation tank to an elevation where there is no substantial buoyant force on the weight means.

5. A pressure source according to claim 1 in which a nozzle is connected to said conduit from which the stream is discharged.

6. In combination: a pressure source according to claim 1, and a shaft drive having a rotary shaft to be driven.

7. A combination according to claim 6 in which the said shaft drive comprises a turbine having a turbine wheel with buckets that bear drive surfaces to be impinged on successively by the stream as it turns the turbine wheel.

8. A combination according to claim 7 in which a nozzle is connected to said conduit from which the stream is discharged.

9. A combination according to claim 8 in which the nozzle is disposed beneath a liquid surface so that the stream can break the surface and apply pressure to a body spaced therefrom, and whereby liquid can be drawn into the chamber through the nozzle to be placed under pressure and expelled therefrom.

10. A combination according to claim 6 in which the shaft drive is a linear actuator.

11. A combination according to claim 10 in which the linear actuator drives a one-way transmission which in turn drives a shaft.

12. A combination according to claim 6 further including an electrical generator driven by the shaft drive.

13. A combination according to claim 6 including a plurality of said pressure sources adapted for sequential cycling.

14. In combination: a plurality of pressure sources according to claim 1 in which the conduits are manifolded.

15. A pressure source according to claim 1 in which the said portions comprise a cylinder having a cylindrical wall, and a piston in said cylinder making a sliding fit with said cylinder wall, and in which said force transmission means comprises a rod fixed to one of the said portions.

16. A pressure source according to claim 15 in which the descent of the weight means occurs without substantial impediment other than the pressurizing means.

17. A pressure source according to claim 1 in which one of the portions is a body having a cylinder, in which the other one of the portions is an elastic diaphragm extending across the cylinder and forming said chamber, and in which the force transmission means comprises a plunger adapted to press the diaphragm into the cylinder to reduce the volume of the chamber.

18. A pressure source according to claim 1 in which said cycling means comprises a supply inlet line through which liquid may be supplied to the tank, a drain line through which liquid can flow from the tank, and control means enabling liquid to flow through the drain line only after it has reached a predetermined upper elevation in the tank.

19. A pressure source according to claim 18 in which the said control means is an intermittent siphon in the drain line.

20. A pressure source according to claim 18 in which said control means is a drain valve in the drain line, and in which means responsive to water at an upper elevation opens said drain valve to flow when the liquid reaches said upper elevation.

21. A pressure source according to claim 18 in which the cycling means further includes an inlet valve which controls flow of liquid through the supply inlet line and enables liquid to flow into the tank so as to fill the tank to said upper elevation.

22. A pressure source according to claim 1 in which the descent of the weight means occurs without substantial impediment other than the pressurizing means.

23. A pressure source according to claim 1 in which the pressurizing means is beneath the weight means, drainage of the water to a level beneath the weight means while the weight means is at an upper elevation applying the full weight of the weight means to the pressurizing means.

24. A method of applying force to a pressurizing means of the type which has an enclosure bounding a chamber, the enclosure comprising a first and a second portion, at least one of which is movable relative to the other as a consequence of said applied force to reduce the volume of the chamber, placing liquid contained therein under pressure, and provide a stream of said liquid under pressure, there being force transmission means to apply said force to said pressurizing means, said method comprising: releasing weight means only in quantum of mass of at least a predetermined weight to bear upon said force transmission means, thereby applying said force to the pressurizing means.

25. A method according to claim 24 in which the weight means is a mass which is buoyantly lifted to an upper elevation for application to the force transmission means.

26. A method according to claim 25 in which the weight means itself is buoyant in the liquid so as to be floated therein, and in which after raising the weight means, the water buoying it is removed to apply the weight means to the pressurizing means.

27. A method according to claim 26 in which the weight means is permitted to descend without substantial impediment other than the pressurizing means.

28. A method according to claim 25 in which the weight means is non-buoyant and raised by buoyant means.

29. A pressure source according to claim 1 in which said release means is a valve in the conduit.

* * * * *

UNITED STATES PATENT OFFICE
CERTIFICATE OF CORRECTION

Patent No. 3,961,480          Dated June 8, 1976

Inventor(s) WILLIAM S. WEST

It is certified that error appears in the above-identified patent and that said Letters Patent are hereby corrected as shown below:

| | |
|---|---|
| Col. 10, line 3 | "imilarly" should read --similarly-- |
| Col. 10, line 51 | between "closely" and "coupled" insert a hyphen |
| Col. 14, line 28 | "if" should read --If-- |
| Col. 15, line 47 | 'means."' should read --means".-- |
| Col. 16, line 8 | 'means."' should read --means".-- |
| Col. 16, line 12 | "of", first occurrence, should read --by-- |
| Col. 16, line 60 (Cl. 1, line 15) | insert a semi-colon after "portion" |

Signed and Sealed this

Thirty-first Day of May 1977

[SEAL]

Attest:

RUTH C. MASON
*Attesting Officer*

C. MARSHALL DANN
*Commissioner of Patents and Trademarks*